United States Patent [19]

Yazane et al.

[11] Patent Number: 5,425,553
[45] Date of Patent: Jun. 20, 1995

[54] SHOCK ABSORBER FOR A STEERING COLUMN

[75] Inventors: Shigeru Yazane; Isao Fujiu; Toshio Watanabe; Masayoshi Yamada, all of Kiryu, Japan

[73] Assignee: Kabushiki Kaisha Yamada Seisakusho, Gunma, Japan

[21] Appl. No.: 98,924

[22] Filed: Jul. 29, 1993

[30] Foreign Application Priority Data

Aug. 7, 1992 [JP] Japan ................... 4-231557

[51] Int. Cl.6 ............................................. B62D 1/19
[52] U.S. Cl. ...................... 280/777; 280/779; 188/374; 74/492
[58] Field of Search ............... 280/777, 775, 779, 780; 188/371, 374, 375, 376, 377; 74/492, 493

[56] References Cited

U.S. PATENT DOCUMENTS

| | | | |
|---|---|---|---|
| 4,838,576 | 6/1989 | Hamasaki et al. | 280/777 |
| 4,901,592 | 2/1990 | Ito et al. | 280/777 |
| 4,989,898 | 2/1991 | Yamaguchi et al. | 280/777 |
| 4,998,999 | 3/1991 | Yuzuhira et al. | 280/777 |
| 5,052,716 | 10/1991 | Matsumoto | 280/777 |
| 5,082,331 | 1/1992 | Melotik | 280/777 |

FOREIGN PATENT DOCUMENTS

| | | | |
|---|---|---|---|
| 2821707 | 11/1978 | Germany | 280/777 |
| 0010964 | 1/1991 | Japan | 280/777 |
| 3136972 | 6/1991 | Japan | 280/777 |

*Primary Examiner*—Margaret A. Focarino
*Assistant Examiner*—Peter C. English
*Attorney, Agent, or Firm*—Lowe, Price, LeBlanc & Becker

[57] ABSTRACT

A crushing through-hole section is formed at an upper portion of a bracket adapted to move together with a steering column. An energy absorbing body is inserted in the crushing through-hole section. The energy absorbing body has a flat fixed portion and a crushable protruding strip portion continuing therefrom, and is mounted immovably. The crushing through-hole section is normally retained at an end portion of the crushable protruding strip portion.

20 Claims, 15 Drawing Sheets

SHOCK ABSORBER FOR A STEERING COLUMN

BACKGROUND OF THE INVENTION

1. Field of the Invention

The present invention relates to a shock absorber for a steering column which has a very simple structure for absorbing a shock occurring when a vehicle driver collides against a steering wheel during an emergency such as a vehicle collision.

2. Description of the Related Art

Conventionally, a curling type shock absorber is widely used for protecting a driver from a shock occurring during a vehicle collision However, this structure for absorbing the shock in a steering apparatus of a vehicle is very complicated and expensive. When the structure becomes complicated, the possibility of failure increases, and reliability is undermined.

SUMMARY OF THE INVENTION

Accordingly, it is an object of the present invention to provide a shock absorber for a steering column which has a very simple structure for absorbing shock occurring at the time of a collision and is capable of improving the safety of the driver, thereby overcoming the above-described drawbacks of the prior art.

To this end, in accordance with one aspect of the present invention, there is provided a shock absorber for a steering column, comprising: a bracket adapted to move together with a steering column and having a crushing through-hole section formed at an upper portion of the bracket; and an energy absorbing body including a crushable protruding strip portion and a flat fixed portion continuing therefrom, the energy absorbing body being mounted immovably on a vehicle body and passed through the crushing through-hole section, the crushing through-hole section being normally retained at an end portion of the crushable protruding strip portion.

In accordance with another aspect of the present invention, there is provided a shock absorber for a steering column, comprising: a bracket adapted to move together with a steering column and having a crushing through hole formed in the bracket, a lower edge of the crushing through hole being set as a lower supporting edge; a crushing portion having a projecting piece for crushing being formed above the crushing through hole; and an energy absorbing body having a crushable protruding strip portion, the energy absorbing body being mounted immovably and passed through the crushing through hole portion, a point of contact between the energy absorbing body and the crushing projecting piece being located more forwardly of the bracket than a point of contact between the energy absorbing body and the lower supporting edge.

The above and other objects, features and advantages of the present invention will become more apparent from the following detailed description of the invention when read in conjunction with the accompanying drawings.

DESCRIPTION OF THE PREFERRED EMBODIMENTS

Figure 1:
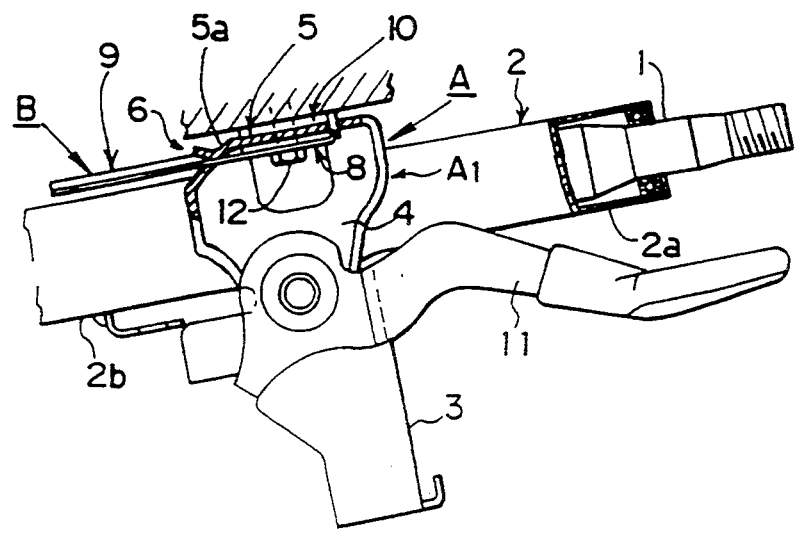
FIG. 1 is a side elevational view of a steering apparatus to which the present invention is applied.

Referring now to the accompanying drawings, a description will be given of the embodiments of the present invention. As shown in FIG. 1, a steering shaft 1 is fitted in a steering column 2 which is comprised of an upper steering column 2a and a lower steering column 2b.

Figure 2:
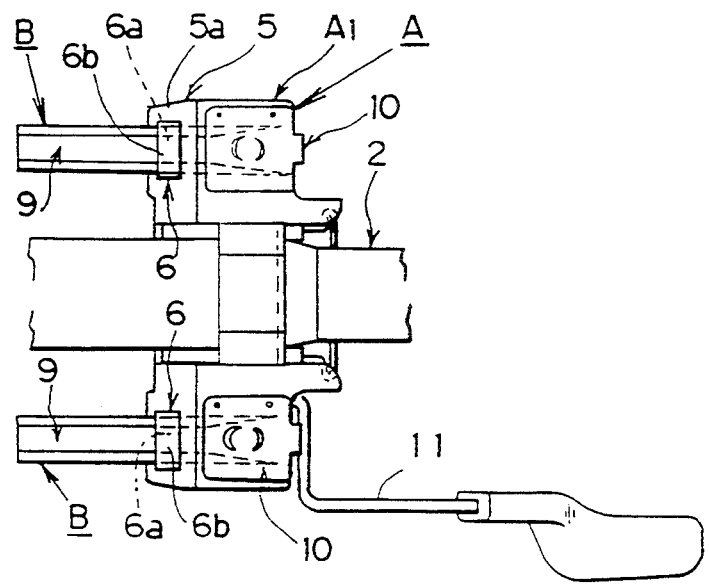
FIG. 2 is a plan view illustrating an essential portion of the shock absorber for a steering column in accordance with the present invention.
Figure 3:
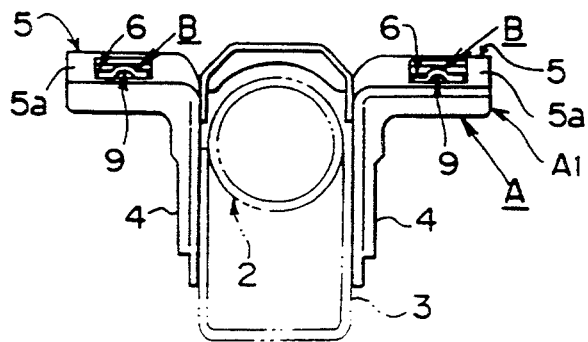
FIG. 3 is a schematic front elevational view illustrating a bracket assembly and energy absorbing bodies.

A bracket assembly A is disposed on an outer periphery of the steering column 2. As shown in FIGS. 2 and 3, this bracket assembly A is arranged to support the steering column 2. In this embodiment, the bracket assembly A comprises of a lifting bracket 3 for raising or lowering the steering column 2 and a fixing bracket A1 for fixing the steering column 2 in position. The lifting bracket 3 is raised or lowered with respect to the fixing bracket A1, thereby setting the steering shaft 1 to an appropriate position.

Figure 4:
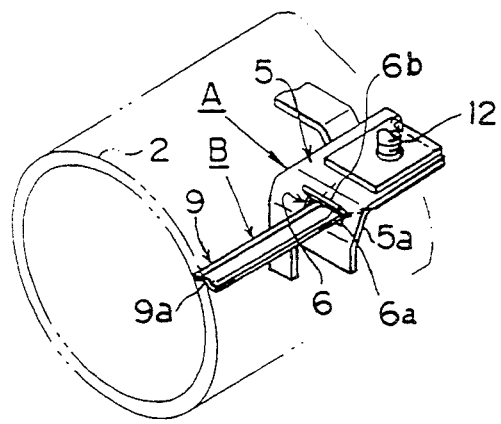
FIG. 4 is a perspective view of an essential portion of a shock absorber for a steering column in accordance with the present invention.
Figure 6:
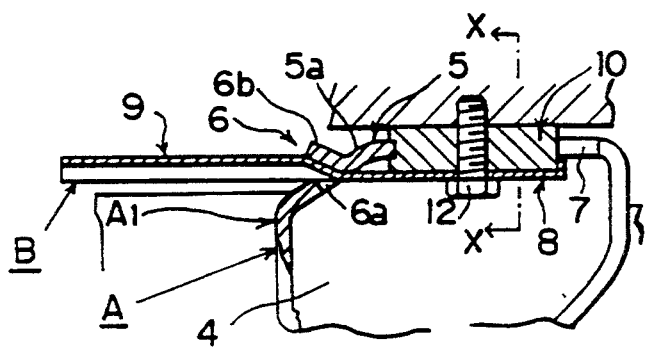
FIG. 6(a) is a vertical cross-sectional view of the essential portion in accordance with the present invention.
FIG. 6(b) is a cross-sectional view taken in the direction of arrows X—X in FIG. 6(a)
Figure 6:
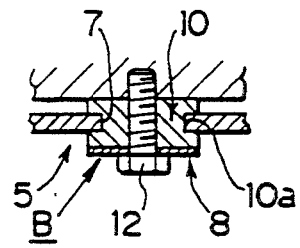

The fixing bracket A1 of the bracket assembly A has a pair of mounting portions 5 projecting horizontally outward from upper ends of a pair of supporting side portions 4, respectively. The mounting portions 5 have identical shapes of bilateral symmetry, and inclined surfaces 5a are each formed at an edge (a left-hand edge of the mounting portion 5 in FIG. 1) of the respective mounting portion 5, as shown in FIGS. 1, 4 and 6. These inclined surfaces 5a serve as end portions of the mounting portions 5.

Figure 21:
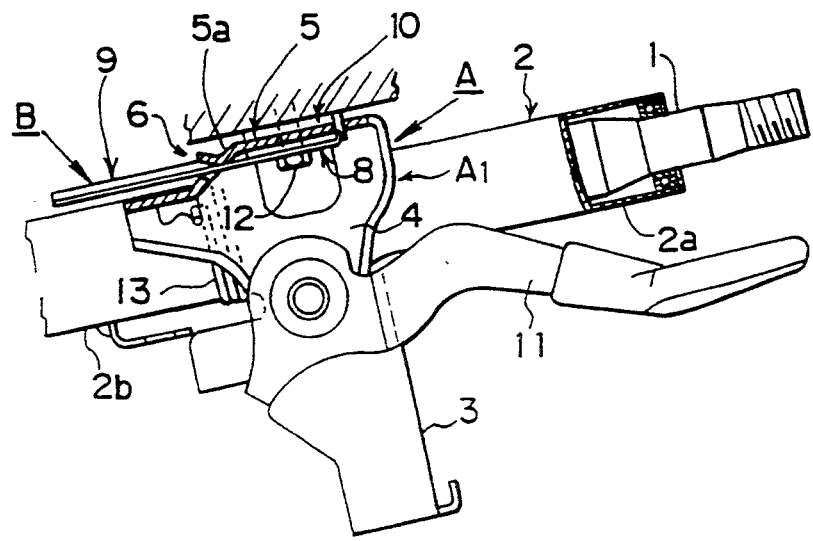
FIG. 21 is a side elevational view of the bracket assembly having a restoring member of another example.
Figure 22:
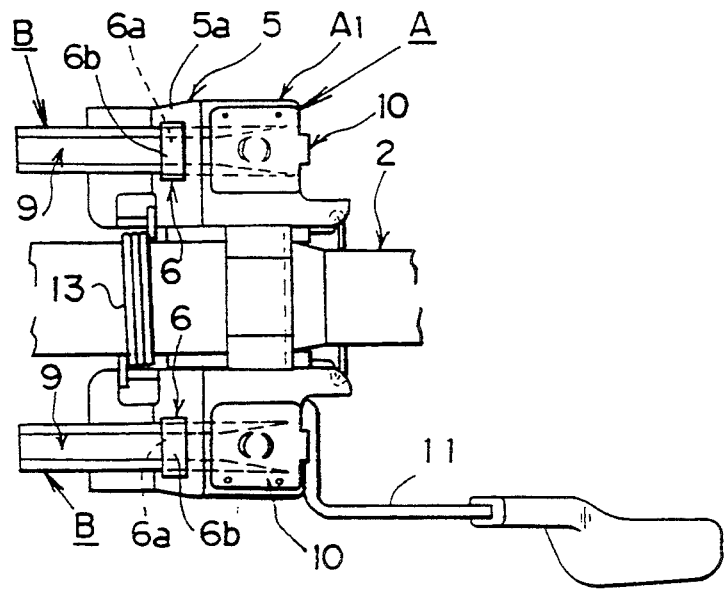
FIG. 22 is a plan view of the bracket assembly having the restoring member shown in FIG. 21.

In another example, the inclined surface 5a is formed as a stepped portion for the mounting portion 5, in which case, the mounting portion 5 has a raised portion and a lowered portion at the inclined surface 5a, as shown in FIGS. 21 and 22.

A crushing through-hole section 6 is formed at the inclined surface 5a. As shown in FIGS. 4 and 6, the crushing through-hole section 6 is comprised of a crushing through hole 6a and a pressing guide 6b, and is adapted to crush a crushable protruding strip portion 9 of an energy absorbing body B which will be described later. As shown in FIGS. 3 and 4, the through hole 6a of the through-hole section 6 is formed in a substantially rectangular shape, and the pressing guide 6b is formed above the through hole 6a. A sliding slot 7 for fitting a mounting member 10, which will be described later, is formed at one end of each of the mounting portions 5.

Figure 19:
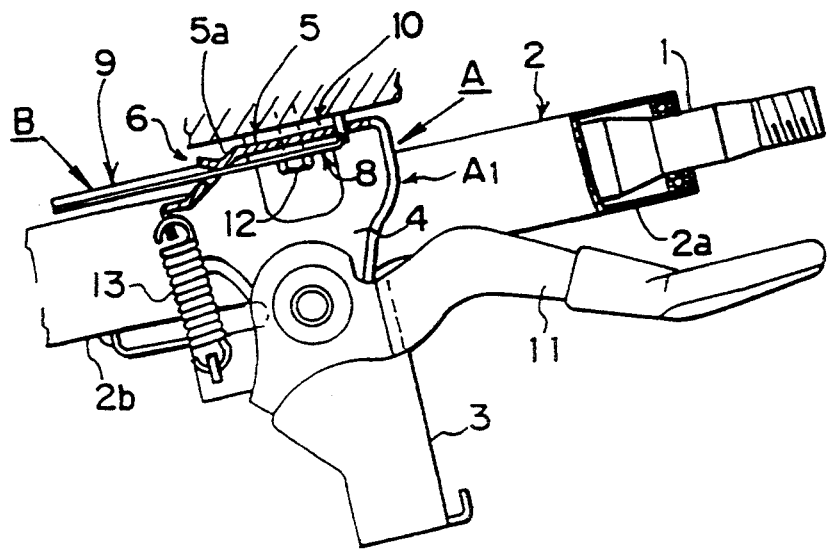
FIG. 19 is a side elevational view of an example of the bracket assembly having a restoring member.
Figure 20:
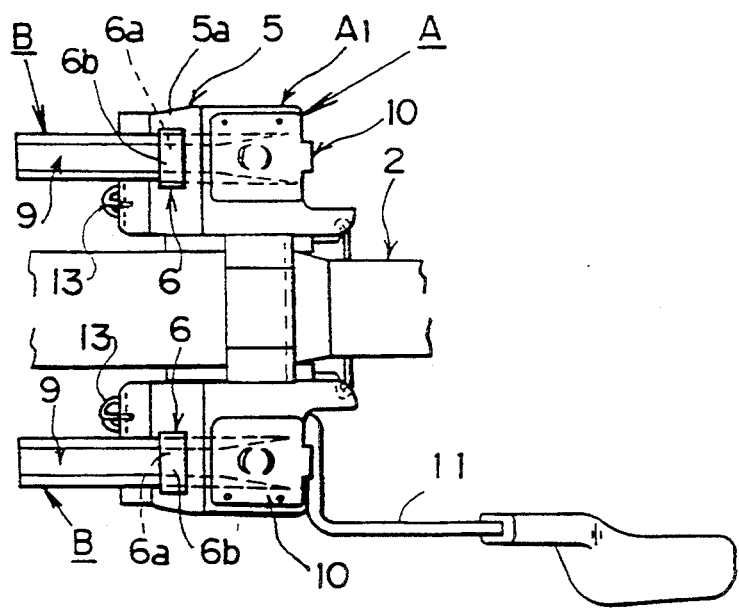
FIG. 20 is a plan view of the example of the bracket assembly having the restoring member.

As shown in FIG. 19, a restoring member 13 having the shape of a coil spring is fitted to the bracket assembly A, and is disposed between the fixing bracket A1 and the lifting bracket 3. In practice, as shown in FIG. 20, the restoring member 13 is fitted between a lower end of the inclined surface 5a and the lifting bracket 3.

In another example, as shown in FIGS. 21 and 22, the restoring member 13 having the shape of a coil spring is wound around the lower steering column 2b, and both ends of the restoring member 13 are retained by the fixing bracket A1.

Figure 5:
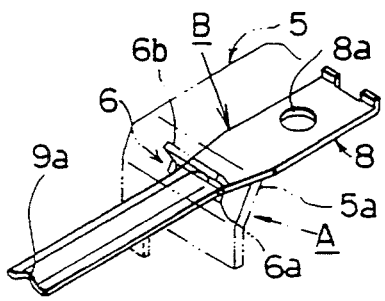
FIG. 5 is a perspective view of an example of the energy absorbing body.
Figure 11:
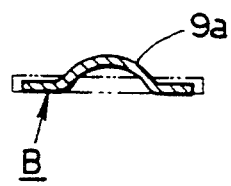
FIG. 11(a) is a cross-sectional view illustrating a state before a crushable protruding strip portion of the energy absorbing body is crushed.
FIG. 11(b) is a cross-sectional view illustrating a state after a crushable protruding strip portion of the energy absorbing body is crushed.
Figure 11:
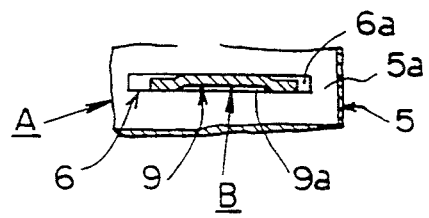

The energy absorbing body B is comprised of a flat fixed portion 8 and the protruding strip portion 9, and there are various examples of the energy absorbing body B. In a first example, as shown in FIG. 5, the energy absorbing body B is formed of a metal strip, and the protruding strip portion 9 has a flat and curved surface 9a with a flat and arcuate cross section formed in a plate-like portion, as shown in FIG. 11(a). The protruding strip portion 9 is formed of a metal strip by press working or the like. A fixing hole 8a is formed for the flat fixed portion 8 for allowing a fixing member 12 such as a bolt (see FIG. 4) to be passed therethrough. The energy absorbing body B is mounted on a vehicle body in a immovable state by means of the fixing member 12.

Figure 12:
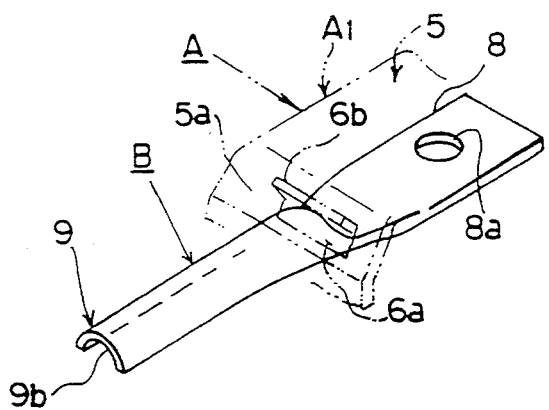
FIG. 12(a) is a perspective view of another example of the energy absorbing body.
FIG. 12(b) is a cross-sectional view of the state in which the crushable protruding strip portion is crushed.
Figure 12:
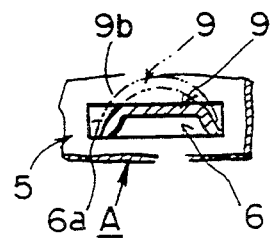

In another example of the energy absorbing body B, as shown in FIG. 12(a), the overall protruding strip portion 9 is formed as a semicircular curved surface 9b. The semicircular curved surface 9b is adapted to be crushed by the through-hole section 6, as shown in FIG. 12(b).

Figure 13:
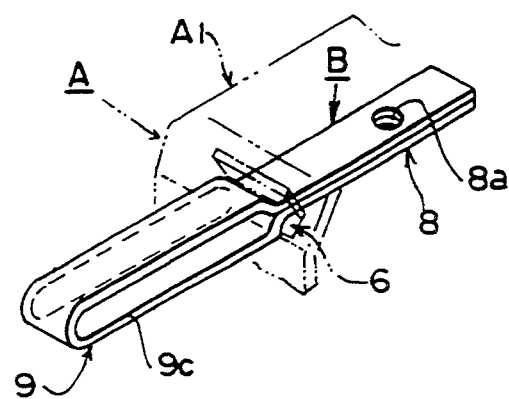
FIG. 13 is a perspective view of still another example of the energy absorbing body.
Figure 14:
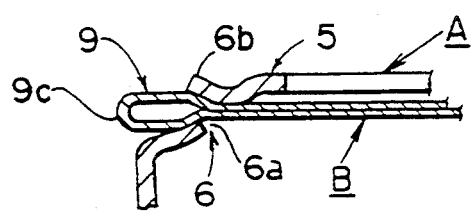
FIG. 14 is a cross-sectional view illustrating a state in which the crushable protruding strip portion is crushed.

In a third example of the energy absorbing body B, as shown in FIG. 13, a metal strip is formed by being folded back in the shape of a hairpin. A flat annular portion 9c is formed in such a manner as to extend from a folded-back portion over an appropriate range along the longitudinal direction, as shown in FIG. 13. The flat annular portion 9c is adapted to be crushed by the through-hole section 6, as shown in FIG. 14.

Figure 15:
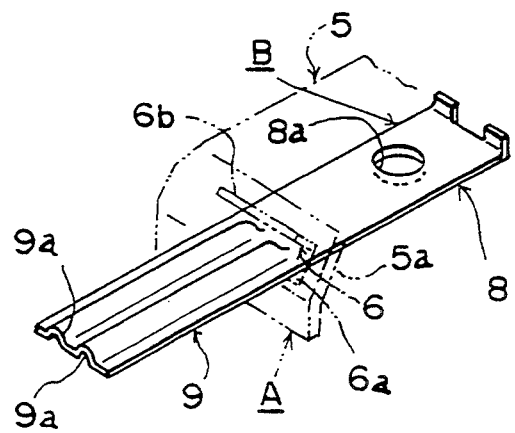
FIG. 15 is a perspective view of an example of the energy absorbing body having two crushable protruding strip portions.
Figure 16:
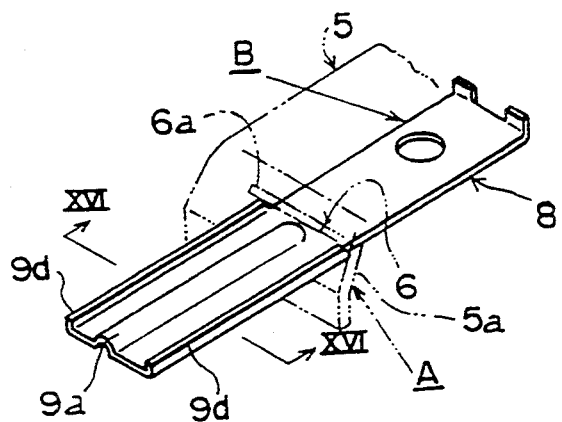
FIG. 16(a) is a perspective view of an example of the energy absorbing body having a crushable protruding strip portion having a W-shaped cross section.
FIG. 16(b) is a cross-sectional view taken along line XVI—XVI in FIG. 16(a)
Figure 16:
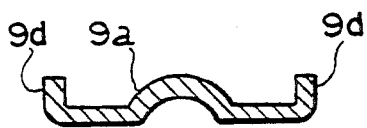
Figure 17:
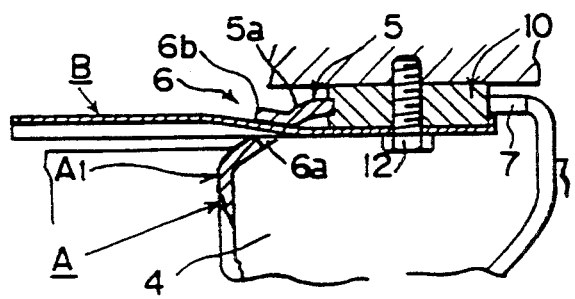
FIG. 17 is a cross-sectional view of an example in which the inclination of an end portion of the crushable protruding strip portion is made gentle.

In still another example of the protruding strip portion 9 of the energy absorbing body B, as shown in FIG. 15, two protruding strip portions 9 are juxtaposed in parallel. In a further example, as shown in FIGS. 16(a) and 16(b), widthwise ends are bent upward to form projections 9d such that the protruding strip portion 9 has a substantially W-shaped cross section. With respect to an end portion of the protruding strip portion 9 on the flat fixed portion 8 side, there are various forms of inclination of that end portion. For instance, in the example shown in FIG. 17, the end portion has a relatively wide range of inclination. In this case, since the inclination of the end portion of the protruding strip portion 9 on the flat fixed portion 8 side is gentle, the impact on the protruding strip portion 9 by the through-hole section 6 at the start of crushing can be made very small.

Figure 8:
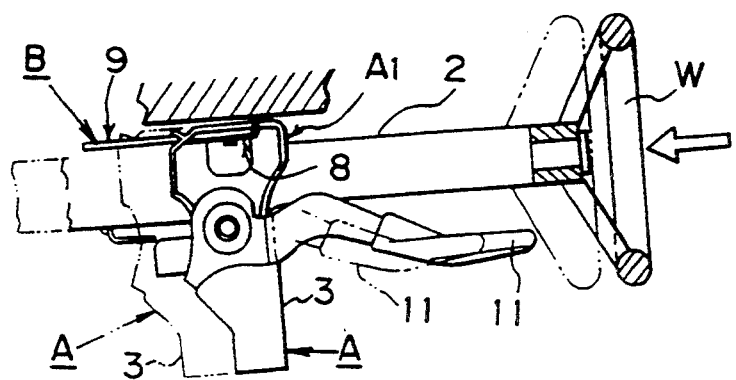
FIG. 8 is a schematic diagram illustrating a state in which a shock has occurred to a steering wheel.

The energy absorbing body B is arranged such that the flat fixed portion 8 is passed through the through hole 6a of the through-hole section 6 formed in the inclined surface 5a of the bracket assembly A, the flat fixed portion 8 is disposed on the rear side of the top plate of the mounting portion 5, and the protruding strip portion 9 projects outside the mounting portion 5 via the through hole 6a of the through-hole section 6. At the same time, as shown in FIG. 8, the flat fixed portion 8 is secured to the vehicle body so as to be .immovable together with the mounting member 10. Here, the vertical dimension of the through hole 6a of the through-hole section 6 is formed to be smaller than the height of the protruding strip portion 9 of the energy absorbing body B, so that the protruding strip portion 9 can be crushed into a flat shape by means of the through hole 6a, as shown in FIG. 11(b).

Figure 10:
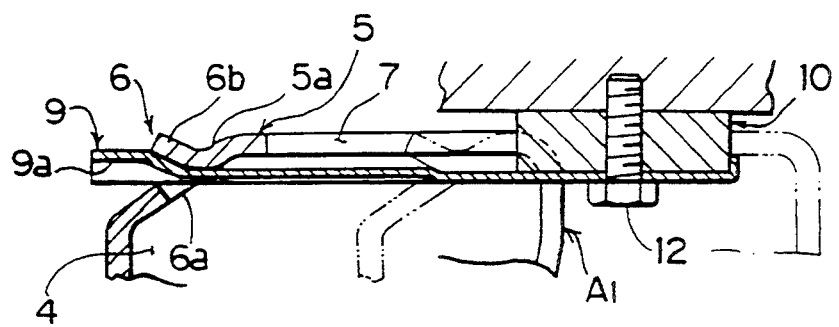
FIG. 10 is a cross-sectional view illustrating the energy absorbing body and the crushing through-hole section after the occurrence of the shock.

A pair of slide portions 10a is formed in each of the mounting members 10, and the slide portions 10a are fitted to the sliding slot 7 formed in the mounting portion 5, such that the mounting portion 5 becomes slidable at the sliding slot 7 with respect to the slide portions 10a. Thus, as shown in FIGS. 7, 8, and 10, the bracket assembly A becomes slidable in the longitudinal direction along the slide portions 10a of the mounting members 10.

The steering column 2 can be set to an appropriate position for the driver by means of the lifting bracket 3 of the bracket assembly A by appropriately operating an operation lever 11.

Figure 7:
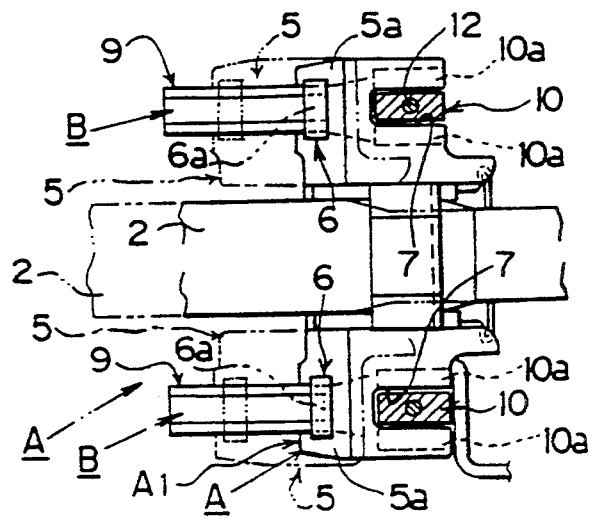
FIG. 7 is a plan view of the bracket assembly.

In the present invention, as for the operating state at the time of absorption of a shock, when the vehicle has collided, the driver collides against a steering wheel W, and as the shock is transmitted to the steering shaft 1 and the steering column 2 via the steering wheel W, the bracket assembly A moves in the forward direction of the vehicle body, as shown in FIGS. 7 and 8.

Figure 9:
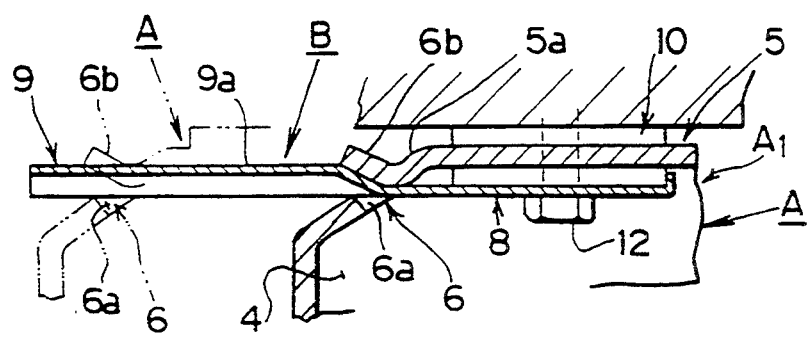
FIG. 9 is a cross-sectional view illustrating the energy absorbing body and a crushing through-hole section before the occurrence of the shock.

At this time, since the mounting members 10 and the energy absorbing bodies B are fixed immovably with respect to the vehicle body, even if the bracket assembly A moves together with the steering column 2, the energy absorbing bodies B do not move. Before the occurrence of the shock, as shown in FIG. 9, the through-hole section 6 of the bracket assembly A is retained at a forward end (on the flat fixed portion 8 side) of the protruding strip portion 9 of the energy absorbing body B. At the time of occurrence of the shock, as shown in FIG. 10, the bracket assembly A moves in the forward direction of the vehicle body, and the through-hole section 6 moves while crushing the protruding strip portion 9 of the energy absorbing body B.

As each through-hole section 6 of the bracket assembly A moves in the forward direction of the vehicle body while crushing the protruding strip portion 9 of the energy absorbing body B, the protruding strip portion 9 is crushed by the through-hole section 6. Consequently, as shown in FIGS. 9 and 10, the shock received by the bracket assembly A via the steering wheel W is absorbed, thereby making it possible to alleviate the shock occurring when the driver collides against the steering wheel W.

Figure 18:
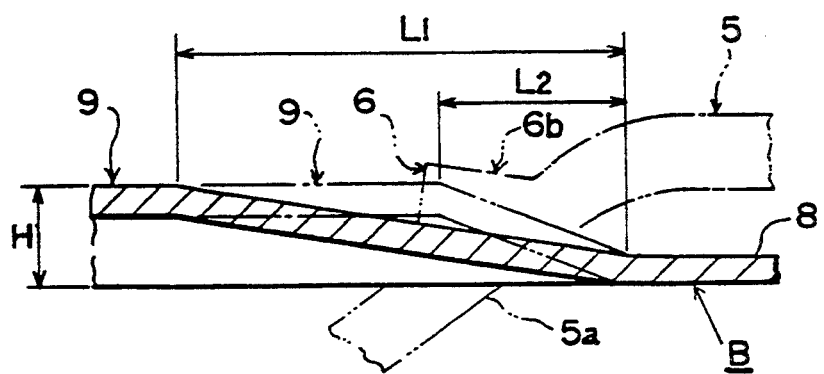
FIG. 18 is an enlarged cross-sectional view illustrating the state of the inclination of the end portion of the crushable protruding strip portion.

As described above, the inclination of the end portion of the protruding strip portion on the flat fixed portion 8 side can be varied, and the effect of the absorption of the shock can be adjusted by the length of the range of its inclination. Specifically, as shown in FIG. 18, in a case where the length of the range of inclination of the end portion of the protruding strip portion 9 on the flat fixed portion 8 side is set to a relatively long length of L1, and if the height of the protruding strip portion 9 is set to be H, the gradient can be set as L1/H. In this case, a large repercussion is not imparted to the driver at the start of the operation of absorbing the energy of the shock.

Furthermore, if the range of inclination of the protruding strip portion 9 is set to be a relatively short length of L2, the gradient becomes L2/H, and the gradient becomes steeper than the above-described gradient, thereby allowing the effect of the operation of absorbing the energy of the shock to take place more quickly.

The pressing guide 6b formed above the through hole 6a of the through-hole section 6 is formed to facilitate the entrance of the protruding strip portion 9 of the energy absorbing body B into the through hole 6a, and is capable of alleviating the shock at the time when the through-hole section 6 begins to crush the protruding strip portion 9 when the shock has occurred.

In this embodiment, the shock absorber for a steering column is arranged such that the through-hole section 6 is formed in the upper portion of the bracket assembly A which moves together with the steering column 2, that the energy absorbing body B comprised of the crushable protruding strip portion 9 and the flat fixed portion 8 continuing therefrom is mounted immovably, that the energy absorbing body B is passed through the through-hole section 6, and that the through-hole section 6 is normally retained at an end of the protruding strip portion 9. Therefore, the shock absorber for a steering column offers various advantages. Firstly, it is possible to make the structure very simple; secondly, the operation can be made reliable; and, thirdly, the state of absorbing the shock can be made constant.

To give a detailed description of the aforementioned advantages, the flat fixed portion 8 and the protruding strip portion 9 of each energy absorbing body B can be formed integrally, and the protruding strip portion 9 can be formed very simply by press working or the like. In addition, the structure of the through-hole section 6 of the bracket assembly A is very simple since it is provided in a penetrated manner so as to allow the protruding strip portion 9 of the energy absorbing body B to be retained thereat. Thus, while the shock absorber for a steering column in accordance with the present invention has the effect of absorbing a shock reliably, the shock absorber can be provided at a very low cost.

Then, as the bracket assembly A moves, each through-hole section 6 thereof moves together with the bracket assembly A, and absorbs the energy of the shock while crushing the protruding strip portion 9 of the energy absorbing body B. Since the structure is simple, a reliable operation of absorbing the shock energy is performed.

Figure 23:
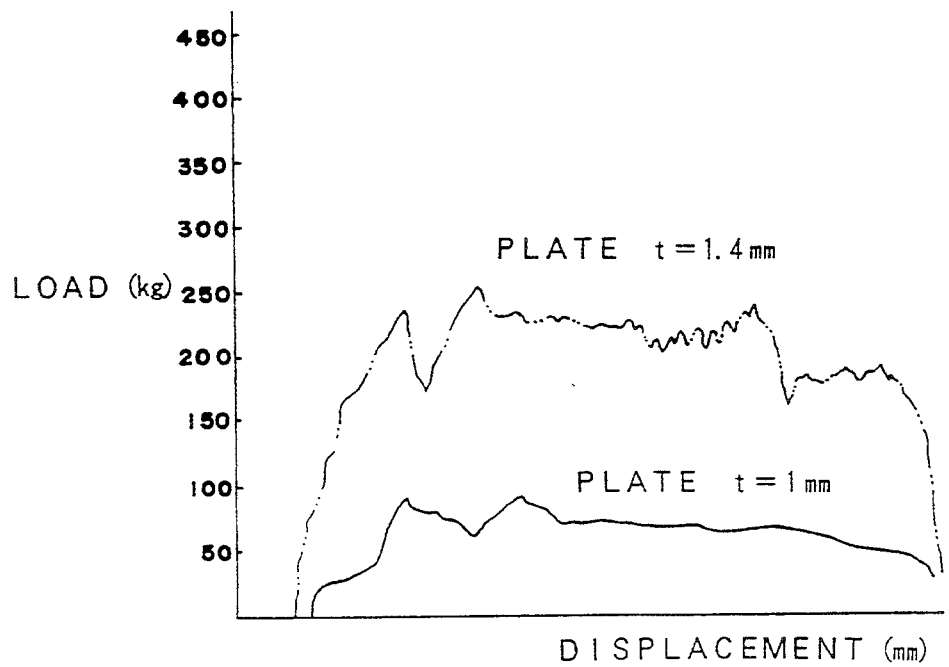
FIG. 23 is a graph illustrating the performance in accordance with the present invention.

Next, by allowing the through-hole section 9 of the energy absorbing body B to be provided with a fixed cross-sectional configuration along the longitudinal direction, it is possible to always make the crushing force constant when the protruding strip portion 9 is crushed by the through-hole section 6. Thus, the state of absorption of the shock energy can be made very smooth. As is also apparent from the graph in FIG. 23, which shows the performance of the present invention, as the state of crushing of the protruding strip portion 9 advances, the acting load is made substantially constant.

Next, a description will be given of another embodiment of the present invention.

The embodiment shown in FIGS. 24 to 27 is characterized in that a lower edge of the through hole 6a formed in the inclined surface 5a is formed as a lower supporting edge, that the pressing guide 6b shown in the foregoing embodiment is modified and set as a crushing projecting piece 21, and that in a state in which the energy absorbing body B is inserted in the through hole 6a, a point of contact between the energy absorbing body B and the projecting piece 21 is located more forwardly of the bracket assembly A than a point of contact between the energy absorbing body B and a lower supporting edge 20. The protruding strip portion 9 protrudes upwardly in such a manner as to have a ridge-shaped portion 9e larger than that of the foregoing embodiment.

Specifically, a distal end of the projecting piece 21 is located at a position closer to the front wheel side than the lower supporting edge 20, so that the lower supporting edge 20 is located at a position closer to the steering wheel side than the projecting piece 21. If the distal end of the projecting piece 21 is designated as a crushing distal edge 21a, the distance between the position of this distal edge 21a and the lower supporting edge 20 is at a predetermined interval L (see FIG. 25).

Figure 24:
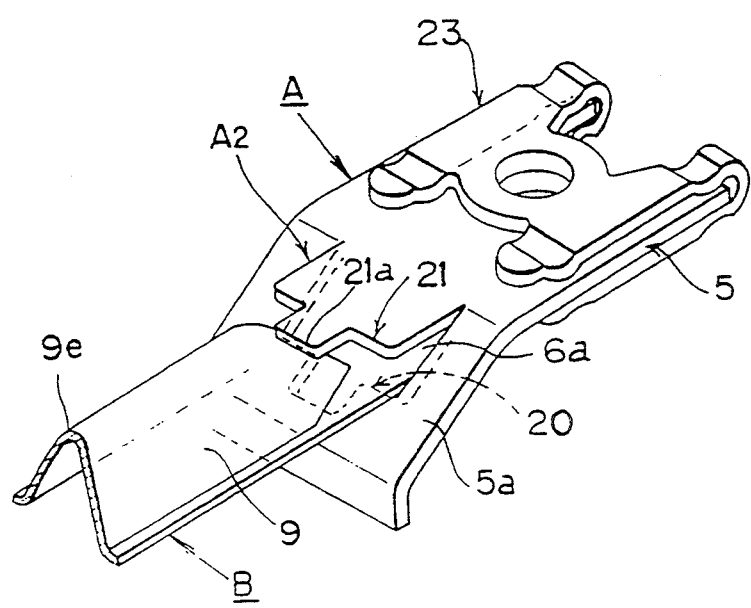
FIG. 24 is a perspective view of the essential portion in accordance with another embodiment of the present invention.
Figure 25:
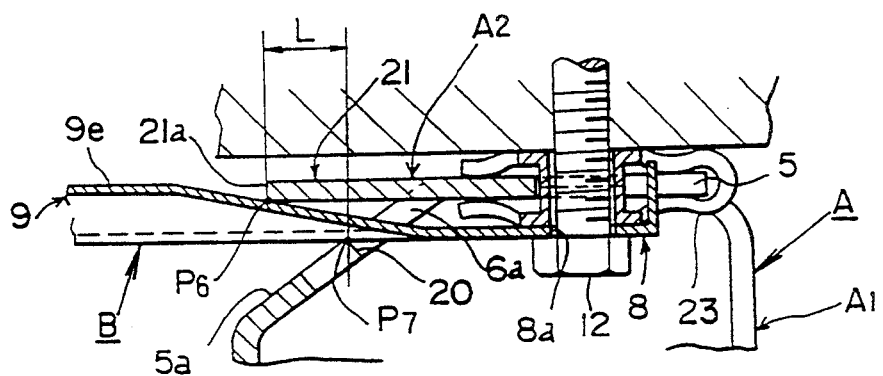
FIG. 25 is a cross-sectional view thereof.

To ensure that the predetermined interval L is provided between the distal edge 21a and the lower supporting edge 20, as shown in FIG. 24, a cutout is provided in such a manner that the planar configuration of the projecting piece 21 becomes ⌂, and this cutout portion is raised to a horizontal position in the outward direction of the bracket assembly A toward the front wheel side (left-hand side in FIG. 25). Thus it is possible to obtain a positional relationship in which the distal edge 21a of the projecting piece 21 projects in such a manner as to be closer to the front wheel side than the lower supporting edge 20.

Since the projecting piece 21 is formed in the shape of ⌂, an outline of the cutout of the distal edge 21a is formed at a central portion of the lower supporting edge 20, as indicated by the dotted line in FIG. 24, so that a notched portion is provided in the center of the lower supporting edge 20. However, the lower surface of the energy absorbing body B can be supported by transversely opposite sides of the notched portion of the lower supporting edge 20.

The energy absorbing body B is arranged such that the flat fixed portion 8 is passed through the through hole 6a formed in the bracket assembly A, the flat fixed portion 8 is disposed on the rear side of the top plate of the mounting portion 5, and the protruding strip portion 9 projects outside the mounting portion 5 toward the front wheel side via the through hole 6a. At the same time, the flat fixed portion 8 is fixed immovably at a predetermined position inside the vehicle via a sliding plate 23.

The distal edge 21a of the projecting piece 21 abuts against the protruding strip portion 9 of the energy absorbing body B, and the lower surface of the energy absorbing body B is supported by the lower supporting edge 20. The points of contact between the upper and lower surfaces of the energy absorbing body B with respect to a crushing portion A2 are offset from each other in the longitudinal direction of the energy absorbing body B. That offset is equivalent to the aforementioned distance between the distal edge 21a of the projecting piece 21 and the lower supporting edge 20.

Here, if it is assumed that the point of contact between the protruding strip portion 9 of the energy absorbing body B and the distal end, i.e., the distal edge 21a, of the projecting piece 21 of the bracket assembly A is a point of contact P6, and that the point of contact between the lower surface of the energy absorbing body B and the lower supporting edge 20 is a point of contact P7, the distance between the point of contact P6 and the point of contact P7 becomes the aforementioned predetermined distance L.

Since the sliding plate 23 and the energy absorbing body B are mounted in an immovable state with respect to the vehicle body, even if the bracket assembly A moves together with the steering column (not shown here), the energy absorbing body B does not move.

Before the occurrence of a shock, as shown in FIG. 25, the distal end (an end of the distal edge 21a) of the projecting piece 21 of the crushing portion A2 abuts against a forward end (on the flat fixed portion 8 side) of the protruding strip portion 9 of the energy absorbing body B and is retained thereat. When the shock occurs, the bracket assembly A moves in the forward direction of the vehicle body.

Figure 26:
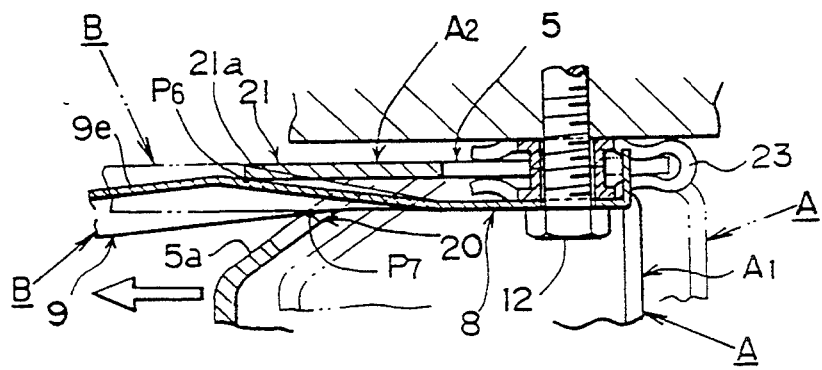
FIGS. 26 and 27 are cross-sectional views illustrating the operation.

At this time, the distal end of the projecting piece 21 of the crushing portion A2 presses down the energy absorbing body B at the point of its contact with the protruding strip portion 9 of the energy absorbing body B with the lower supporting edge 20 set as a fixed end, thereby imparting a bending load to the energy absorbing body B, as shown in FIG. 26.

Figure 27:
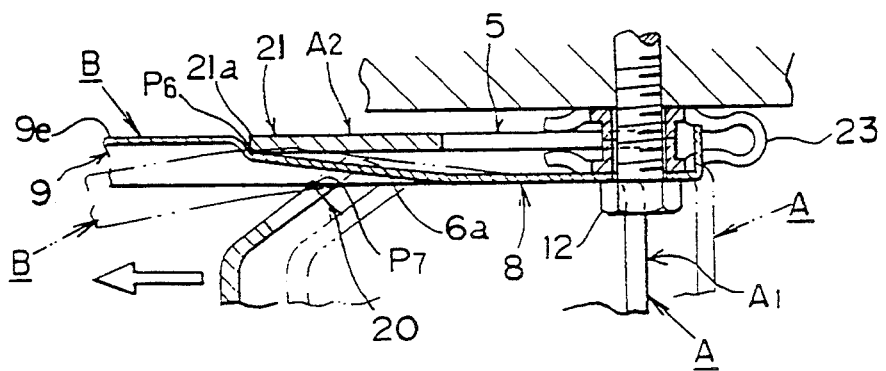
Figure 28:
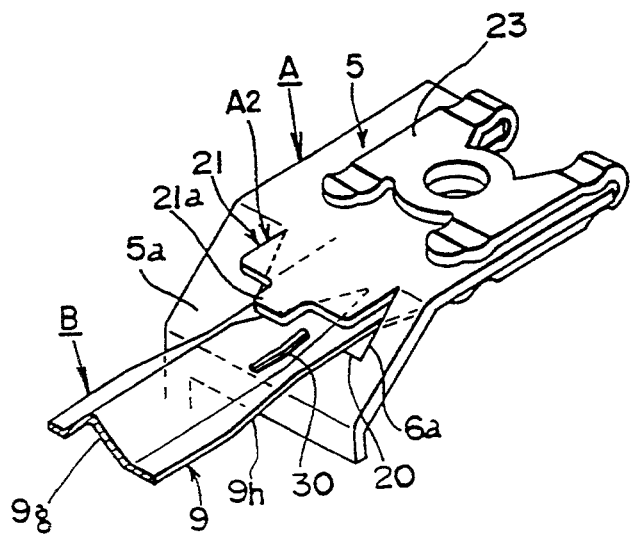
FIG. 28 is a perspective view of the essential portion in accordance with still another embodiment of the present invention.
Figure 29:
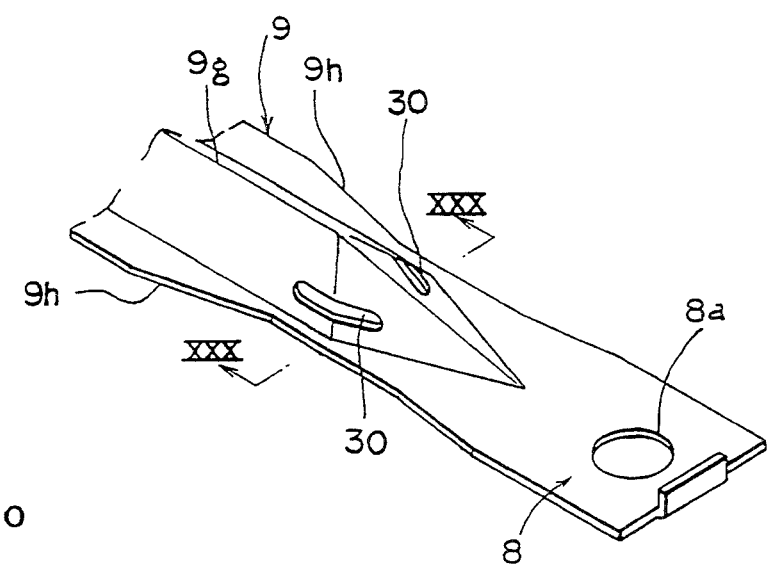
FIG. 29 is a perspective view of an essential portion of the energy absorbing body used in that embodiment.
Figure 30:
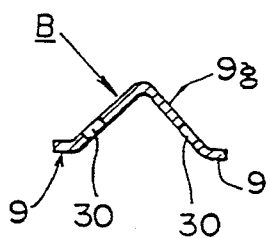
FIG. 30 is a cross-sectional view taken along line XXX—XXX in FIG. 29.
Figure 31:
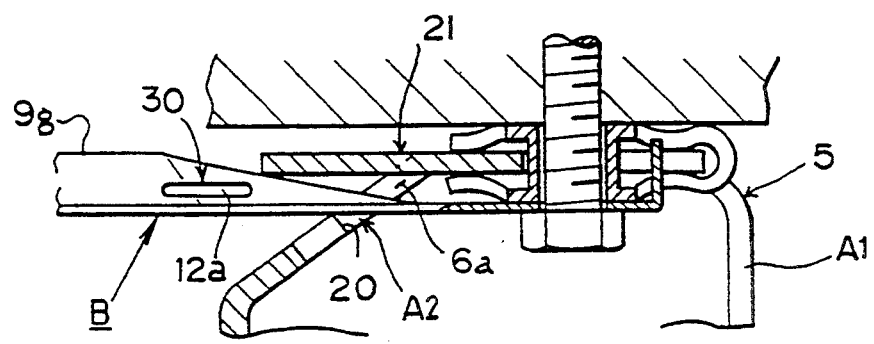
FIG. 31 is a cross-sectional view of FIG. 28.
Figure 32:
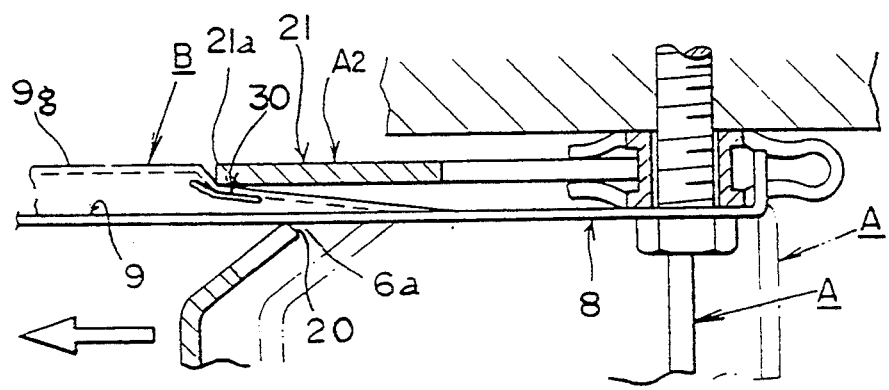
FIG. 32 is a cross-sectional view illustrating the state in which crushing begins to take place.
Figure 33:
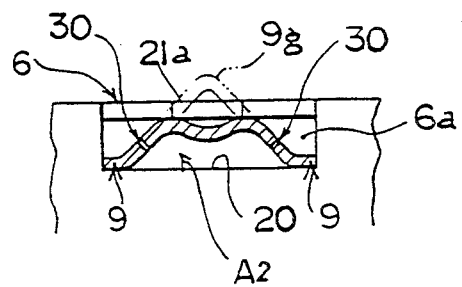
FIG. 33 is a cross-sectional view illustrating the state of deformation of the energy absorbing body.

Then, as the bracket assembly A moves further toward the front wheel side, as shown in FIG. 27, the load changes from the bending load with respect to the energy absorbing body B to a pressing load with respect to the protruding strip portion 9, thereby starting the operation of crushing the protruding strip portion 9.

In accordance with such an embodiment, it is possible to obtain the following advantages.

Namely, the energy absorbing body B is in contact with the projecting piece 21 at the point of contact P6, and is in contact with the lower supporting edge 20 at the point of contact P7. Since the point of contact P6 projects more outwardly of the bracket assembly A than the point of contact P7, and the distance therebetween is large, if the bracket assembly A moves toward the front wheel side, the projecting piece 21 crushes the protruding strip portion 9 of the energy absorbing body B, and, substantially at the same time, applies a bending load upon the energy absorbing body B with the lower supporting edge 20 as a fixed end.

Thus, since the operation of crushing the protruding strip portion 9 with respect to the energy absorbing body B and the operation of applying a bending load upon the energy absorbing body B take place substantially at the same time, the operation of absorbing the shock can be made very smooth at the start of energy absorption at the time of a collision.

In addition, the energy absorbing body B is supported with the projecting piece 21 and the lower supporting edge 20 positionally offset from each other, and is supported on the rear surface of the mounting portion 5 of the bracket assembly A. In other words, since the energy absorbing body B is supported at three points, the projecting piece 21, the lower supporting edge 20, and the mounting portion 5, the energy absorbing body B can be set in a state in which it is tentatively secured quite stably. As a result, it is very advantageous when this shock absorber manufactured as an assembly is transported to a vehicle body assembly plant.

Referring now to FIGS. 28 to 37, a description will be given of still another embodiment of the present invention. In the following description, parts or portions which are identical or equivalent to those of the foregoing embodiments will be denoted by the same reference numerals, and a description thereof will be omitted or simplified.

This embodiment is characterized in that a pair of weakened portions 30 is selectively formed in the portion of the protruding strip portion 9 constituting a part of the energy absorbing body B, and that a pair of inclined side edges 9h for being crushed is selectively formed at a boundary area between the protruding strip portion 9 and the flat fixed portion 8 continuing therefrom.

Namely, as shown in FIGS. 28 to 33, the energy absorbing body B is formed by the flat fixed portion 8 and the protruding strip portion 9 continuing therefrom. The protruding strip portion 9 has a ridge-shaped portion 9g, and a foot portion of this ridge-shaped portion 9g is set at the height of the same plane as that of the flat fixed portion 8.

Figure 34:
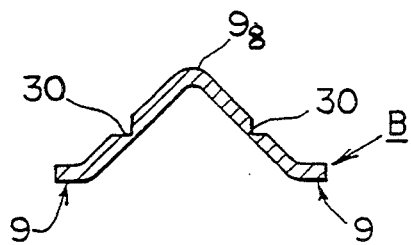
FIGS. 34 and 35 are cross-sectional views illustrating modifications of weakened portions shown in FIG. 28.
Figure 35:
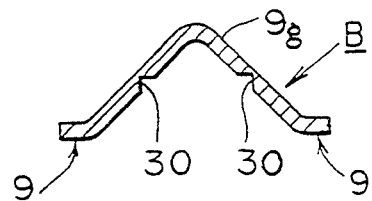

The pair of weakened portions 30 in the form of through holes is formed in the ridge-shaped portion 9g on the flat fixed portion 8 side thereof. As for the structure of the weakened portions 30, in addition to the through holes, the weakened portions 30 may be formed with a small thickness, as shown in FIGS. 34 and 35. Thus, the number and the shape of the weakened portions 30 provided may be changed arbitrarily.

The inclined side edges 9h are formed at the boundary area between the protruding strip portion 9 and the flat fixed portion 8. Each inclined side edge 9h is formed in such a manner that its width becomes greater from the flat fixed portion 8 toward the protruding strip portion 9. The inclined side edges 9h are adapted to be gradually subjected to the crushing action by the left and right side edges defining the through hole 6a.

Figure 36:
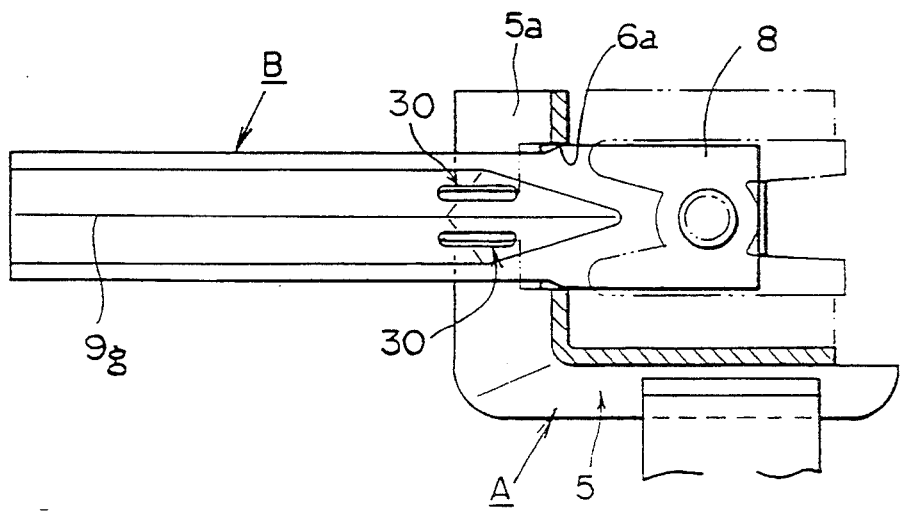
FIGS. 36 and 37 are plan views illustrating the modifications.
Figure 37:
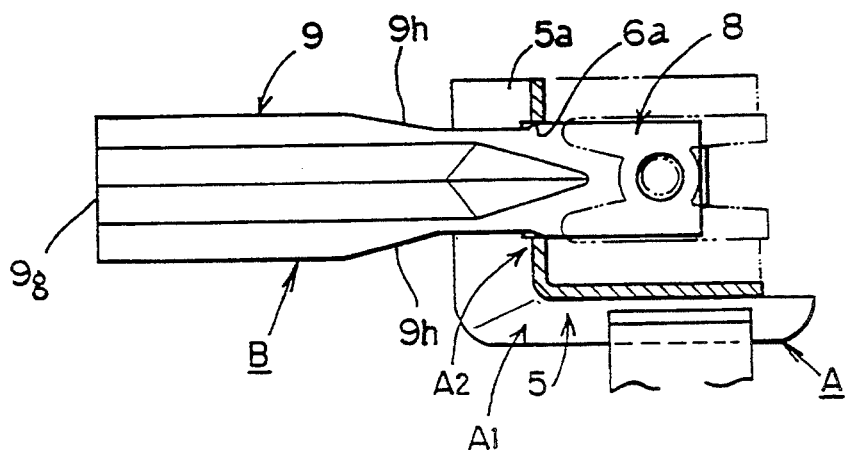

It should be noted that, as shown in FIGS. 36 and 37, the weakened portions 30 and the inclined side edges 9h may be provided selectively, or only either of them may be provided.

In such an embodiment, an additional advantage can be obtained that, when the crushing force is applied, the crushing action can be allowed to take place very smoothly with the weakened portions 30 as a center.

In addition, in a case where the inclined side edges 9h are formed, it is possible to obtain a large deforming load without substantially changing the plate thickness and the like of the energy absorbing body B.

Figure 38:
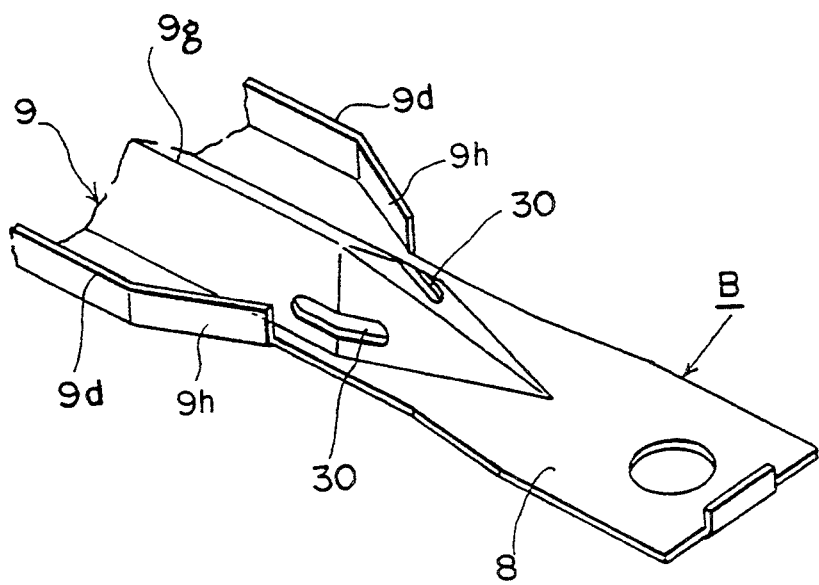
FIG. 38 is a perspective view of still another modification of the weakened portions.

Furthermore, the projection 9d may be formed at the side edge of the inclined side edge 9h in such a manner as to be oriented upward, so that the energy absorbing body B has a substantially W-shaped cross section in the widthwise direction, as shown in FIG. 38.

What is claimed is:

1. A shock absorber for a steering column, comprising:
    a bracket adapted to move together with the steering column, said bracket including a bracket mounting portion having an inclined surface area at edge portions thereof, and including a crushing through-hole section formed in said inclined surface area; and
    an energy absorbing body including a crushable protruding strip portion and a flat fixed portion continuing therefrom, said energy absorbing body being mounted immovably on a vehicle body and passing through said crushing through-hole section, said crushing through-hole section being normally retained at an end portion of said crushable protruding strip portion.

2. A shock absorber for a steering column according to claim 1, wherein widthwise side portions of said crushable protruding strip portion are formed flat, and a widthwise central portion thereof protrudes upwardly along the longitudinal direction of said crushable protruding strip portion.

3. A shock absorber for a steering column according to claim 1, wherein said crushable protruding strip portion has a widthwise cross section of a semicircular arc.

4. A shock absorber for a steering column according to claim 1, wherein said crushable protruding strip portion is folded back in a form of a hairpin.

5. A shock absorber for a steering column according to claim 1, wherein said crushable protruding strip portion has a widthwise cross section of a substantially W-shaped configuration.

6. A shock absorber for a steering column according to claim 1, wherein a maximum height of said crushable protruding strip portion is set to be larger than the height of an opening of said crushing through-hole section.

7. A shock absorber for a steering column according to claim 1, wherein an inclined side edge for being crushed is formed at a boundary area between said flat fixed portion and said crushable protruding strip portion.

8. A shock absorber for a steering column according to claim 7, wherein the width of said inclined side edge is formed to be gradually larger from said flat fixed portion toward said crushable protruding strip portion.

9. A shock absorber for a steering column, comprising:
    a bracket adapted to move together with the steering column and having a crushing through-hole portion formed in said bracket, a lower edge of a crushing through-hole in said portion being set as a lower supporting edge;
    a crushing portion having a projecting piece for crushing being located on said bracket above said crushing through-hole; and
    an energy absorbing body having a crushable protruding strip portion, said energy absorbing body being mounted immovably on a vehicle body and passing through said crushing through-hole portion, a point of contact between said energy absorbing body and said crushing projecting piece being located more forwardly of said bracket in a direction toward a front end of said vehicle body than a point of contact between said energy absorbing body and said lower supporting edge.

10. A shock absorber for a steering column according to claim 9, wherein widthwise side portions of said crushable protruding strip portion are formed flat, and a widthwise central portion thereof protrudes upwardly along the longitudinal direction of said crushable protruding strip portion.

11. A shock absorber for a steering column according to claim 9, wherein said crushable protruding strip portion has a widthwise cross section of a semicircular arc.

12. A shock absorber for a steering column according to claim 9, wherein said crushable protruding strip portion is folded back in a form of a hairpin.

13. A shock absorber for a steering column according to claim 9, wherein said crushable protruding strip portion has a widthwise cross section of a substantially W-shaped configuration.

14. A shock absorber for a steering column according to claim 9, wherein a maximum height of said crushable protruding strip portion is set to be larger than the height of the crushing through-hole of said crushing through-hole portion.

15. A shock absorber for a steering column according to claim 9, wherein said energy absorbing body comprises said crushable protruding strip portion and a flat fixed portion continuing from said crushable protruding strip portion, a weakened portion being formed in an end portion of said crushable protruding strip portion on a side of said fixed portion.

16. A shock absorber for a steering column according to claim 15, wherein said weakened portion is formed by an elongated through hole.

17. A shock absorber for a steering column according to claim 15, wherein said weakened portion is formed by a pair of through holes provided symmetrically about a widthwise center of said crushable protruding strip portion.

18. A shock absorber for a steering column according to claim 15, wherein said weakened portion is formed by a thin-walled portion provided in said crushable protruding strip portion.

19. A shock absorber for a steering column according to claim 15, wherein said weakened portion is formed by a pair of thin-walled portions provided symmetrically about a widthwise center of said crushable protruding strip portion.

20. A shock absorber for a steering column according to claim 15, wherein an inclined side edge for being crushed is formed at a boundary area between said flat fixed portion and said crushable protruding strip portion.

* * * * *